United States Patent [19]

Frutiger et al.

[11] 4,095,046
[45] June 13, 1978

[54] ELECTRONIC ENCIPHERING- AND DECIPHERING APPARATUS IN THE FORM OF A POCKET CALCULATOR

[75] Inventors: Peter Frutiger, Wangen; Bruno Gemperle, Steinhausen, both of Switzerland

[73] Assignee: Anstalt Europaische Handelsgesellschaft, Vaduz, Liechtenstein

[21] Appl. No.: 737,285

[22] Filed: Nov. 1, 1976

[30] Foreign Application Priority Data

Nov. 11, 1975 Switzerland .................. 14587/75

[51] Int. Cl.² .................. H04K 1/02; H04L 9/02
[52] U.S. Cl. .................. 178/22; 340/337; 178/30
[58] Field of Search .................. 178/26 A, 30, 22; 340/337, 325

[56] References Cited

U.S. PATENT DOCUMENTS 3,878,331 4/1975 Morgan et al. .................. 178/22
4,068,089 1/1978 Frutiger .................. 178/22

OTHER PUBLICATIONS

"Hand-Held Terminal to Give Field Troops Access to Data Nets", Electronics, Nov. 11, 1976, pp. 29–30.

Primary Examiner—Howard A. Birmiel
Attorney, Agent, or Firm—Ostrolenk, Faber, Gerb & Soffen

[57] ABSTRACT

An electronic enciphering- and deciphering apparatus in the form of a pocket calculator, comprising an input device for the input of characters to be processed, a control device for the input of control commands determining the function of the apparatus, an output device for the display of information, and a power source for the apparatus. A primary storage or memory serves for the storage of the entered character information, the output side of which can be connected with the output device and a cipher computer which can be connected at its output side with the output device. At least one key character storage is operatively associated with the cipher computer, the key character storage being connectable with the input device. A central control unit can be controlled by the control device. The control unit, as a function of the entered control commands, determines the information paths in the apparatus and controls the aforementioned components, so that depending upon the entered control commands the output device displays the character information entered at the input device or the information stored in the primary storage or the character information produced by the cipher computer.

20 Claims, 6 Drawing Figures

Fig. 6

ELECTRONIC ENCIPHERING- AND DECIPHERING APPARATUS IN THE FORM OF A POCKET CALCULATOR

BACKGROUND OF THE INVENTION

The present invention relates to a new and improved construction of an electronic enciphering- and deciphering apparatus in the form of a pocket calculator, comprising an input device for the entering of the characters to be processed, a control device for the entering of control commands determining the mode of operation or function of the apparatus, an output device for the display of the information, and a power source for powering the apparatus.

It is preferable that cipher equipment for enciphering and deciphering of information should provide, to the extent possible, a visual indication of both the entered (primary) text and the processed (secondary) text.

In Swiss Patent No. 336,210 there is disclosed, for instance, a mechanically operating pocket apparatus for the enciphering and deciphering of characters, wherein both the non-processed and processed characters are visible. Yet, the use of this apparatus is cumbersome since the printed text to be processed must be enciphered and deciphered, character-for-character by means of the apparatus.

SUMMARY OF THE INVENTION

Hence, it is a primary object of the present invention to provide an improved construction of electronic enciphering- and deciphering apparatus in the form of a hand held device which overcomes the foregoing drawbacks and limitations of the prior art constructions.

Another and more specific object of the present invention is to provide a new and improved apparatus which, while possessing a compact construction, enables reliable and rapid enciphering and deciphering of information, so that the apparatus can be easily transported by the user and placed into operation at any time and wherever desired without any difficulties.

In order to implement these and still further objects of the invention, which will become more readily apparent as the description proceeds, the present invention provides a primary storage or memory for the storage of the entered character information, the output side of which can be connected with the output device and a so-called cipher computer. The output side of the cipher computer is connectable with the output device and at least one key character storage is operatively associated therewith. The key character storage, in turn, can be connected with the input device and controlled by a central control unit which can be controlled by the control device. The central control unit, as a function of the individual control commands, determines the information routes or paths in the apparatus and controls the aforementioned components. Depending upon the entered control commands, the output device displays the character information entered at the input device or the information stored at the primary storage or the character information produced by the cipher computer.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
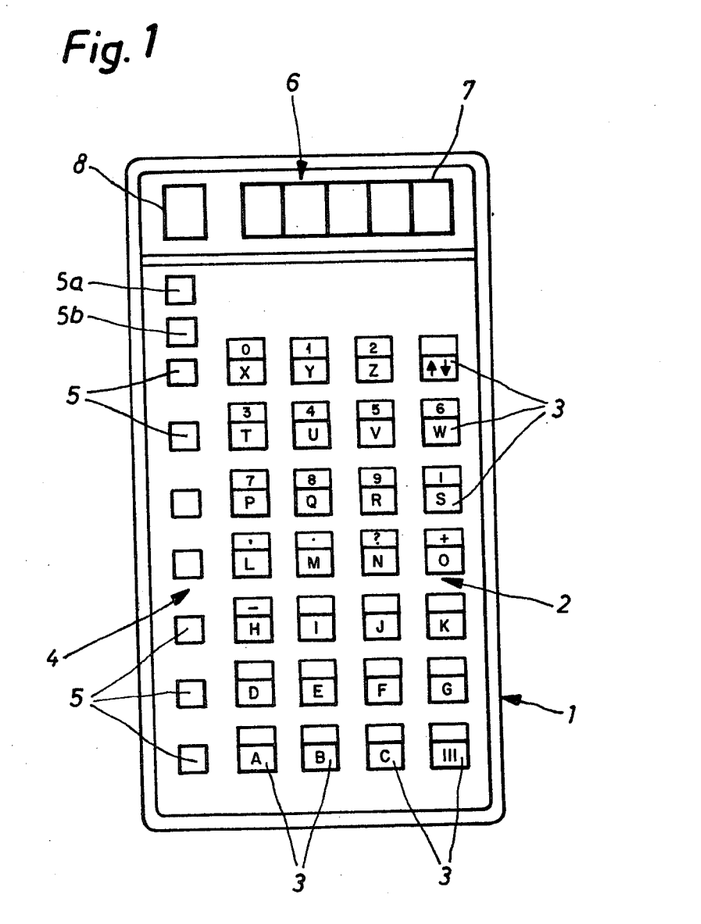
FIG. 1 is a top plan view of an apparatus constructed according to the present invention for enciphering and deciphering, shown in the form of a pocket calculator.

Referring now to the drawings, there is shown in FIG. 1, one embodiment of the present invention, — hereinafter referred to as a cipher apparatus—, having the shape of a pocket calculator. The electronic components, which will be considered more fully hereinafter with respect to the circuit diagrams of FIGS. 2 to 6, are housed in a housing 1 possessing a substantially rectangular configuration in plan view. The dimensions of the housing 1 are maintained such that the apparatus can be conveniently carried, for instance in the pocket of the jacket of a user. The apparatus will be seen to comprise an input device comprising an input keyboard 2 having push buttons 3, serving for the entering of characters which are to be processed. Further, there is provided a control device comprising a control keyboard 4 having the control push buttons 5, serving for the entering of control commands determining the mode of operation or function of the apparatus.

The keyboards 2 and 4 are of conventional construction and commercially available, by way of example, from the following companies: Grayhill, Klixon, and Amphenol.

Above the keyboards 2 and 4 there is arranged an output device comprising an optical read-out or display device 6 which may be of any standard construction. This display device 6 has a first indicator or display field 7 for displaying a given number of characters, for instance 5 characters, and a further indicator or display field 8 for the display of the operating state of the apparatus. Both of the indicator or display fields 7 and 8 can be equipped, for instance, with luminescent diodes, liquid crystals or any other appropriate electrical display systems, as are well known from the pocket calculator art and available, for instance, from any of the following companies: Monsanto, Beckmann, and Siemens.

As mentioned, further components are arranged internally of the housing 1. The most important ones of these components have been illustrated in FIGS. 2 to 6, whereas other possibly present necessary components, the use and construction of which are well known to those versed in this particular technology and are not necessary for understanding the underlying principles of the present invention, have therefore been conveniently omitted from the showing and description.

Figure 2:
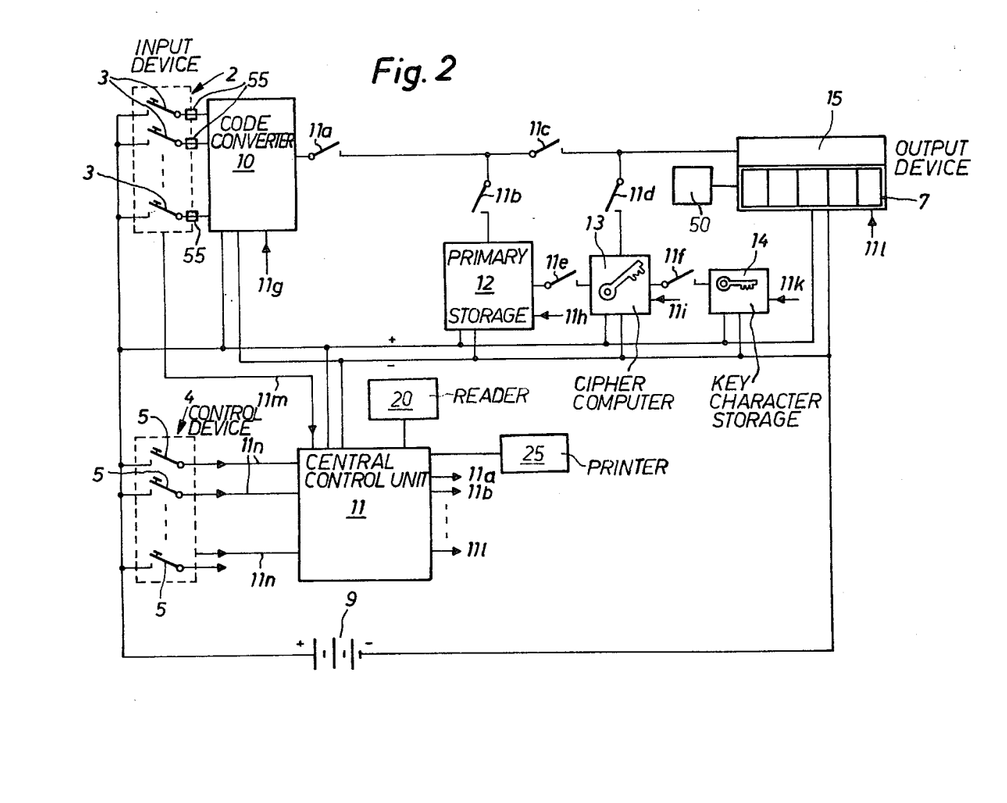
FIG. 2 is a block circuit diagram of the apparatus of FIG. 1.

Turning attention to the block circuit diagram of FIG. 2, and as already stated, there have been illustrated therein the most important components of the apparatus and their mutual interconnection. The pushbuttons 3 of the input keyboard 2 are connected, on the one hand, with a power or voltage source 9 (primary- or secondary battery cells) arranged in the housing 1 and, on the other hand, with a code converter 10. This code converter 10, in conventional manner, converts the information entered by pushing or otherwise actuating the buttons 3, according to a code, for instance the 5-unit code or 8-unit code governed by CCITT No. 2 or CCITT No. 5 respectively. This conversion into a binary code allows for simple information processing in the apparatus, so that instead of the 26 or more individual lines or conductors needed for serial portrayal there is only required one conductor or with parallel portrayal only 5 or 8 lines or conductors.

It is equally conceivable to use a keyboard which directly delivers in coded form the entered information. In such instance the code converter 10 no longer would be necessary.

The keyboard 2 is additionally connected with a central control unit (CPU) 11, and specifically by means of the conductor or line 11m.

The buttons 5 of the control keyboard 4 are likewise connected with the power or voltage source 9 and by means of the conductors or lines 11n with the central control unit 11. By means of the buttons 5 control commands are entered to the control unit 11. Depending upon the construction of this control unit 11 it is possible, analagous to the input keyboard 2, to connect in series after the control keyboard 4 a code converter.

The central control unit 11 influences the entire functional sequence or operation of the apparatus. It can consist of, for instance, a microprocessor having appropriately programmed control command storages or memories, for instance of the type commercially available from any of the following well known companies: INTEL, Motorola, and Radio Corporation of America (RCA).

Reference character 12 designates a primary storage or memory connected with the voltage source 9 and serving to store the entered information, for instance, 500 characters. This primary storage 12 can constitute a ferrite core memory or ferrite store, such as commercially offered by any one of the following well known companies: Siemens, Philips, Mitsubishi, or also can be a random access memory or store (RAM), for instance available from any of the following companies: INTEL, Motorola, and RCA.

The so-called cipher computer, which carries out the actual enciphering and deciphering of the entered information, has been conveniently designated by reference character 13. Arranged in circuit after the cipher computer 13, is a key character storage or memory 14 which, like the cipher computer 13, is connected with the power or voltage source 9. The key character storage 14 can be constructed analagous to the primary storage or memory 12, but as a general rule would possess a smaller capacity.

Based upon the key character information received from the key character storage 14 the cipher computer 13 delivers for each entered plain text character one or more cipher-text characters and vice versa. As a general rule, there is not possible a relation of 1:1 between the plain text characters and the cipher text characters, if there are present more than 26 characters for the plain text, but, however the cipher-text or message can be portrayed for instance in 5er-groups consisting of Latin letters only. The cipher or key character computer 13 can operate for instance according to the principles described in Swiss Patent No. 362, 555, U.S. Pat. No. 3,480,729 and U.S. Pat. No. 3,755,631, the disclosure of which is incorporated herein by reference, wherein, however, for the construction thereof there are preferably employed modern electronic microcomponents (integrated circuits).

As to both of the display or indicator fields 7 and 8 of the optical display device 6 there has only been shown the display or indicator field 7. The non-illustrated display field 8 for the indication of the operating state is controlled by the central control unit 11 like the display field 7. This indicator or display field 7 is operatively coupled with a shift register 15 which renders it possible, as desired, to bring about a stepwise or uniformly progressive running display or a display of complete character groups, in other words, for instance 5-unit groups. One usable type of such display group construction is commercially available, for instance, from Burroughs Corporation. The display field 7, depending upon requirements, is coupled with code converters which, based upon the information which is entered in the form of a binary code, renders optically visible the associated character or symbol.

In the case of self-illuminating elements there can be provided a conventional time-delay circuit or device for saving power, which extinguishes the display device 6 if during a predetermined period of time no functions are carried out and has been schematically indicated in FIG. 2 by reference character 50. Such solutions are nowadays conventional for pocket calculators, for instance as exemplified by the products on the market of the firm known as Commodore Business Machines Inc.

As already mentioned, the central control unit 11 controls the functional operations or sequence of functions, in the apparatus. In order to better understand the functional operations there have been illustrated in FIG. 2 the switching means 11a to 11l associated with the control unit 11, and which have been illustrated purely symbolically partly as switches and partly as control lines or conductors. In actual practice these generally constitute control lines, since in the electronic art pure switching functions can be carried out by appropriately controlling suitable components. The showing by way of switches has therefore been solely chosen to improve the illustration of the manner in which the information flow occurs within the apparatus.

Based upon the illustration of FIGS. 3 to 6, which correspond to the block circuit diagram of FIG. 2, there will be described hereinafter the different functional operations.

Figure 3:
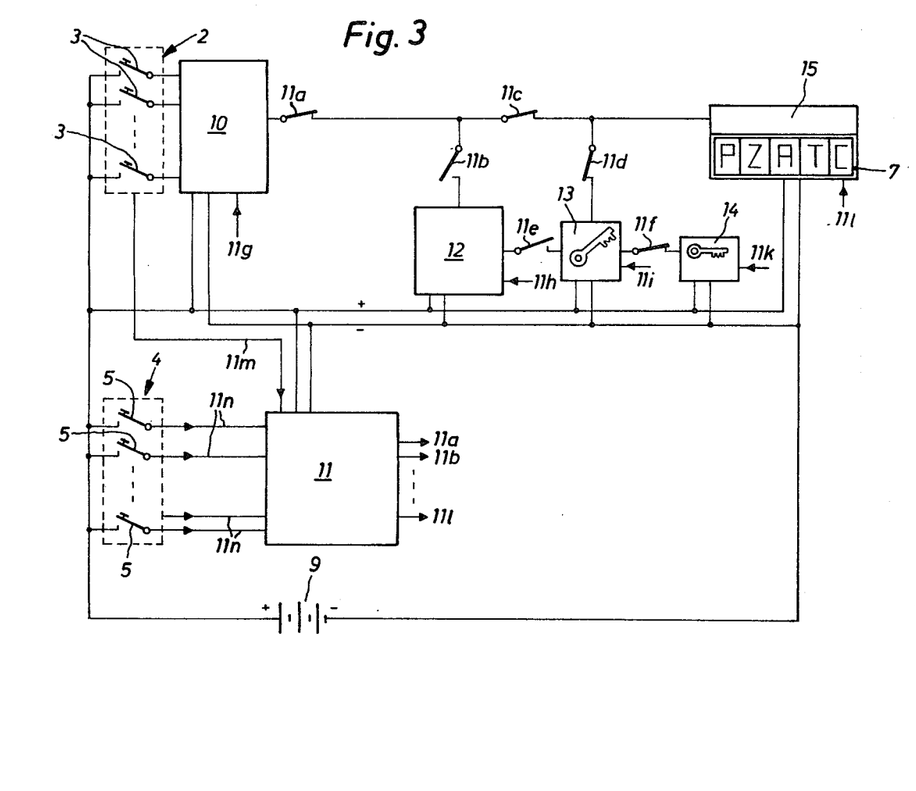
FIGS. 3, 4, 5 and 6, respectively illustrate different operating conditions of the apparatus illustrated in the block circuit diagram of FIG. 2.

FIG. 3 illustrates the operating state upon entering of the key character information to the key character storage 14. This entering preferably occurs by means of the keyboard 2. Each key character which has been entered by actuating a corresponding push button 3, arrives at the key character storage 14, and additionally, is displayed for control purposes at the read-out or display field 7. In FIG. 3 the data route or path is fixed by the closed switches 11a, 11c, 11d and 11f. By means of the conductor or line 11m the keyboard 2 is connected in such a manner with the central control unit 11 that the control unit 11 properly arranges the characters entered to the key character storage 14 and upon reaching a given count of key characters blocks the further entering. It is possible for the control unit 11 to provide an indication in the display field 8 (FIG. 1) of this blocking state.

Figure 4:
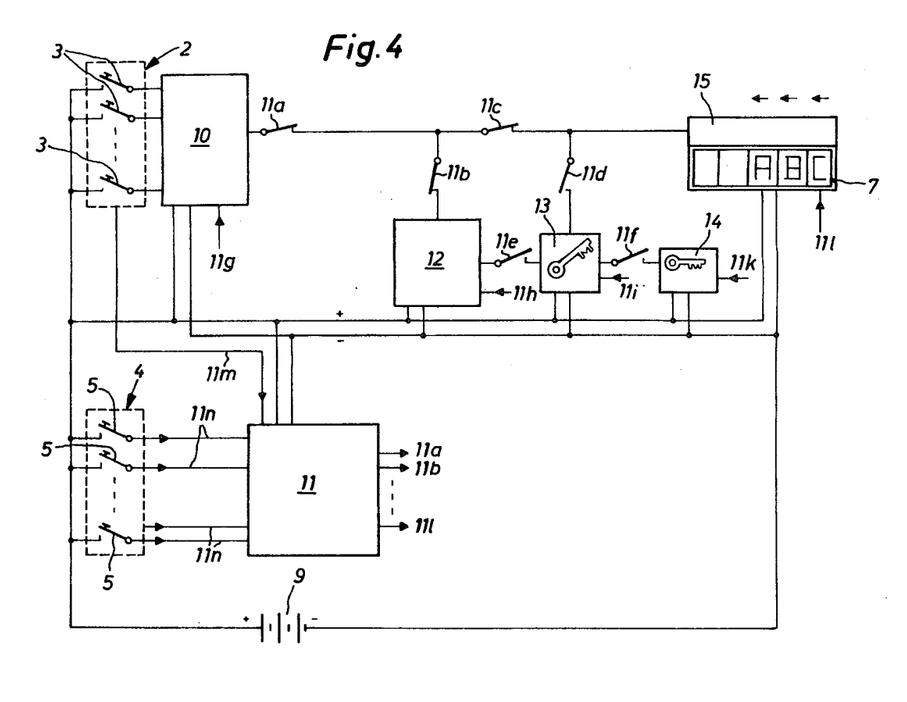

FIG. 4 illustrates the operating condition upon the entering and storage of a text or message which is to be processed and may be present as an enciphered message or plain text. The characters entered by means of the keyboard 2 via the data route illustrated in FIG. 4, are entered on the one hand to the primary storage or memory 12, and on the other hand, displayed in the display field or zone 7. The central control unit 11 ensures for a proper storage of the characters in the primary storage 12.

The entered characters are individually and successively, preferably arriving from the right as illustrated in FIG. 4, displayed by means of the shift register 15.

If the entering of the message or text has been completed, then, by actuating an appropriate button 5 of the keyboard 4 the end of the message input is announced, providing an appropriate display in the display field 8 (FIG. 1). In the event that the primary storage 12 is filled, then by means of the central control unit 11 the further entering of characters is blocked. An appropriate display of this blocking state can be carried out in the display field 8.

Figure 5:
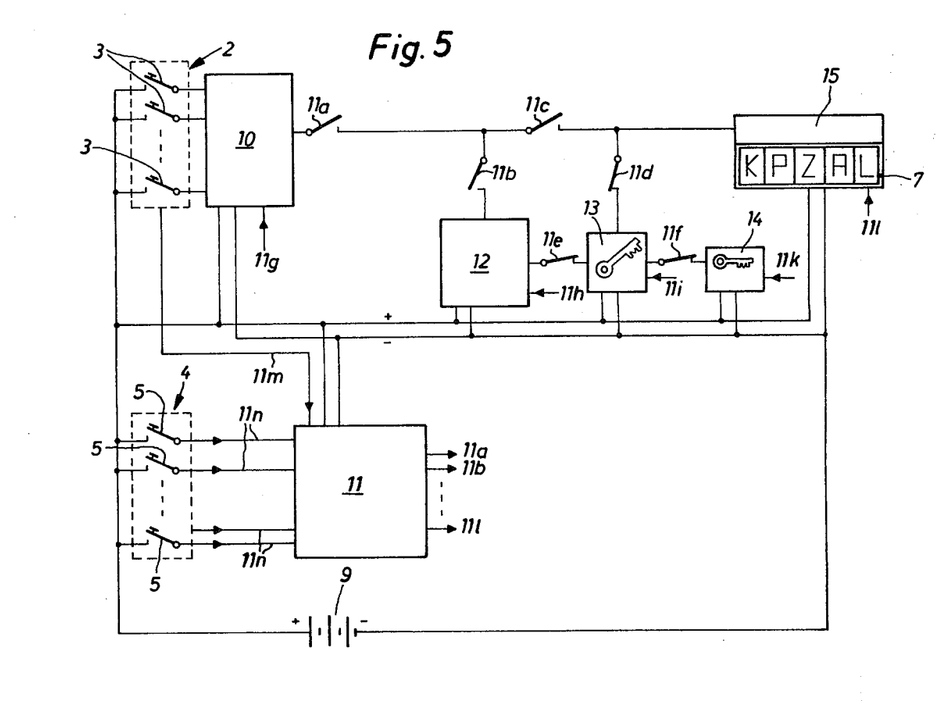

FIG. 5 illustrates the operating state during enciphering and deciphering, respectively, the information stored in the primary storage 12. The information stored in the primary storage 12 arrives character-for-character at the cipher computer 13, which receives by means of the key character storage 14 the key character information, with the proper functional operations being controlled by the control unit 11. The cipher computer 13 processes the binary character elements received from the primary storage 12 and the key character storage 14, as previously described and in conventional manner. The processed characters are transmitted from the cipher computer 13 to the shift register 15 and then displayed in the display field 7.

During enciphering the functional sequence occurs advantageously such that in each case upon activating an appropriate control button 5 of the keyboard 4 there is displayed an entire character group, i.e., in the exemplary embodiment under discussion a 5-unit group.

During deciphering the display advantageously is accomplished such that the characters arrive from the right so that during each activation of an appropriate control button 5 the characters travel towards the left by one place. However, if the aforementioned control button 5 is continuously depressed or activated, then, the characters are displayed in the form of a running text, and the travel speed is chosen such that there is possibly reading and possibly written recordal of the continuously moving text or message.

Figure 6:
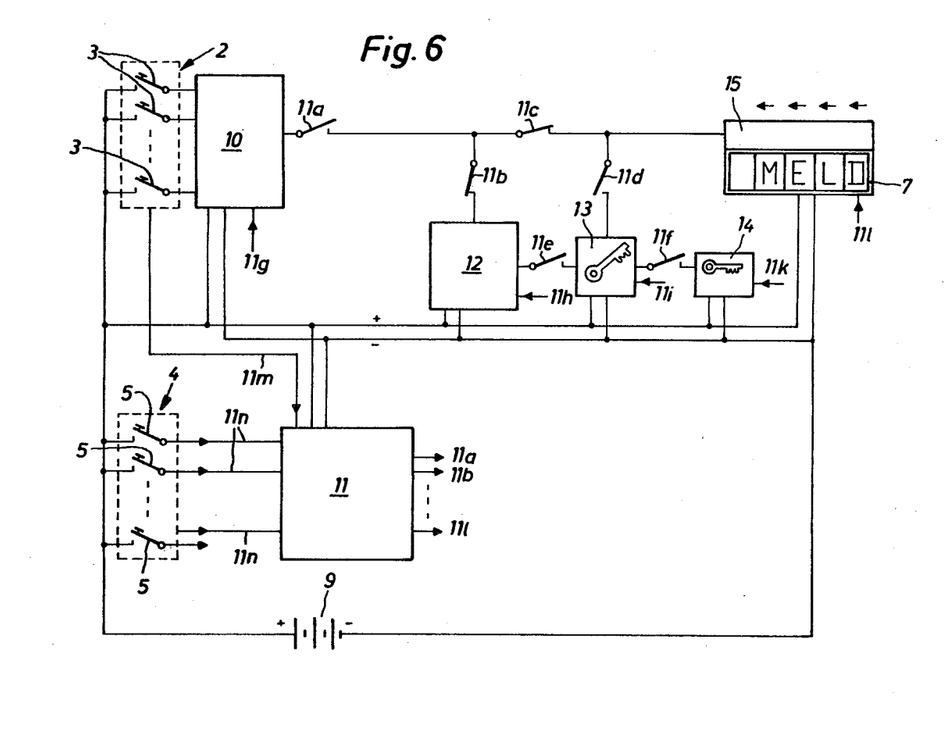

In FIG. 6 there is illustrated an operating state wherein it is possible to visually display the information stored in the primary storage 12. By depressing or otherwise activating the control button 5 discussed during the description of FIG. 5, the information stored in the primary storage 12 is rendered visible in the display field 7, and specifically in a continuously throughpassing or in a stepwise shifted form. Consequently, control of the stored information is possible before it is processed. Clearing and correcting buttons such as for example the buttons 5a and 5b, respectively, of the control keyboard 4 enable correcting possible errors.

The input keyboard 2 and the control keyboard 4 as well as the indicator or display device 6 with the display fields 7 and 8 (and the shift registers 15, if used) can be connected by means of plug connections with the remaining components of the apparatus which are housed in the apparatus housing 1. Such plug connection has been schematically illustrated by reference character 55 for the input keyboard 2. This allows for removal of the keyboards 2 and 4 and the display device 6 and affords the possibility of connecting in lieu thereof other input- /and output devices at the apparatus. Thus, it is possible, for the entering of information to suitably connect in circuit a perforated tape- /or magnetic tape reader, as generally indicated in FIG. 2 by reference character 20, and to employ as the output device a printer, as generally indicated by reference character 25. Such type arrangement has been disclosed in greater detail in the commonly assigned copending United States application, Ser. No. 743,130, filed Nov. 19, 1976, entitled "Enciphering and Deciphering Apparatus in the Form of a Typewriter", the disclosure of which is incorporated herein by reference.

It is also possible, apart from the described keyboards 2 and 4 and the display device 6, which are fixedly mounted in the housing 1 of the apparatus, to connect by means of parallel plug connections the above-mentioned components for the input and output of the text or message. In this regard, reversing switches are provided allowing for selective switching from the one input- or output device, respectively, to the other input- or output device, respectively, as disclosed for instance in the aforementioned copending application.

While there are shown and described present preferred embodiments of the invention, it is to be distinctly understood that the invention is not limited thereto, but may be otherwise variously embodied and practiced within the scope of the following claims. Accordingly,

What is claimed is:

1. An integrated enciphering and deciphering apparatus having a size and shape adapted to be hand held, said apparatus comprising:
   A. input means for entering key and text data to be processed;
   B. mode select means for selectively placing said apparatus in either a text data entry mode, a key data entry mode, a text data display mode, and enciphering mode or a deciphering mode;
   C. primary storage means for storing text data entered by said input means when said apparatus is in said text data entry mode;
   D. key storage means for storing key data entered by said input means when said apparatus is in said key data entry mode;
   E. output means for displaying data applied thereto;
   F. cipher computer means for respectively enciphering and deciphering said text data stored in said primary storage means as a function of said key data stored in said key storage means when said apparatus is in said enciphering and deciphering modes;
   G. circuit control means for;
      1. causing said text data to be applied to said output means as it is entered by said input means when said apparatus is in said text data input mode;
      2. causing said stored text data to be applied to said output means when said apparatus is in said text data display mode; and
      3. causing said enciphered and deciphered data to be applied to said output means when said apparatus is in said enciphering or deciphering modes, respectively.

2. The apparatus as defined in claim 1 wherein said output means comprises an optical display means comprising at least one display field for the display of a given number of characters and wherein said apparatus further includes a housing having a size and shape adapted to be hand held; at least said circuit control means, said primary storage means, said cipher computer means, said key storage means, said keyboards and said optical display means being arranged in said housing.

3. The apparatus as defined in claim 2, wherein said keyboards and said optical display means are permanently attached to said housing.

4. The apparatus as defined in claim 2, wherein said keyboards and the optical display means are provided with plug connection means for connecting said keyboards and the optical display means with predetermined ones of remaining components of the apparatus.

5. The apparatus as defined in claim 1, further including a housing, having a size and shape adapted to be hand held; said circuit control means, said primary storage means, said cipher computer means and said key storage means all being arranged in said housing.

6. The apparatus as defined in claim 1, wherein said input means and said mode select means each comprise a respective keyboard provided with a plurality of push buttons.

7. The apparatus as defined in claim 6, where said mode select keyboard includes extinguishing and correction buttons for correcting faulty characters introduced into said primary storage means.

8. The apparatus as defined in claim 6, further including a code converter for converting the data received by said input keyboard, to a form which can be accepted by said primary storage means.

9. The apparatus as defined in claim 8, wherein said code converter also converts said data received by said keyboard to a form which may be accepted by said output means.

10. The apparatus as defined in claim 1, wherein said input means and said mode select means each are provided with an automatic data reader.

11. The apparatus as defined in claim 10, wherein at least one of said readers comprises a perforated tape reader.

12. The apparatus as defined in claim 10, wherein at least one of said readers comprises a magnetic tape reader.

13. The apparatus as defined in claim 1, wherein said output means comprises an optical display means containing at least one display field for the display of a given number of data characters.

14. The apparatus as defined in claim 13, further including a shift register operatively connected with the display field in such a manner that the data applied to said output means is progressively stepped through said display field either as a running text or in blocks as a function of the mode of operation of said apparatus.

15. The apparatus as defined in claim 13, wherein said optical display means includes a second display field for indicating the operating mode of said apparatus.

16. The apparatus as defined in claim 13, further including means for extinguishing the display of the optical display means when the apparatus does not carry out any functions within a given period of time.

17. The apparatus as defined in claim 16, wherein said extinguishing means comprises time-delay means.

18. The apparatus as defined in claim 1, wherein said output means comprises a printer.

19. The apparatus as defined in claim 18, wherein said input means and said mode select means each comprise an automatic reader, and wherein said readers and said printer comprise removable units connectable by means of plug connection means with predetermined ones of remaining components of the apparatus.

20. The apparatus as defined in claim 19, further including reversing switch means for selectively connecting said keyboards, said readers, said optical display means or said printer with predetermined ones of remaining components of the apparatus.

* * * * *